United States Patent [19]

Blomquist

[11] Patent Number: 4,501,087
[45] Date of Patent: Feb. 26, 1985

[54] FISHING EQUIPMENT

[76] Inventor: Bradley E. Blomquist, 3210 Lake George Rd., Lake Orion, Mich. 48035

[21] Appl. No.: 387,045

[22] Filed: Jun. 10, 1982

[51] Int. Cl.³ .............................................. A01K 85/00
[52] U.S. Cl. .................. 43/42.06; 43/43.16; 43/42.2; 43/42.51
[58] Field of Search ............... 43/42.06, 42.11, 42.17, 43/42.18, 42.2, 42.31, 42.19, 42.51, 43.13, 42.16

[56] References Cited

U.S. PATENT DOCUMENTS

| | | | |
|---|---|---|---|
| D. 206,808 | 1/1967 | Yokich | D22/29 |
| D. 226,083 | 1/1973 | Drake | D22/29 |
| 1,566,059 | 12/1925 | Willson | 43/42.51 |
| 2,001,055 | 5/1935 | DeWitt | 43/42.51 |
| 2,598,965 | 6/1952 | Bain | 43/42.11 |
| 2,665,516 | 1/1954 | Race | 43/42.06 |
| 2,769,268 | 11/1956 | Miller | 43/42.06 |
| 2,911,751 | 11/1959 | Mason | 43/42.06 |
| 3,432,957 | 3/1969 | Marino | 43/42.2 |
| 3,568,351 | 3/1971 | Perrin | 43/43.13 |
| 4,411,090 | 10/1983 | Seals | 43/43.13 |

FOREIGN PATENT DOCUMENTS

| | | | |
|---|---|---|---|
| 505400 | 8/1954 | Canada | 43/43.13 |
| 528021 | 7/1956 | Canada | 43/42.2 |

Primary Examiner—Gene P. Crosby

[57] ABSTRACT

Improved fishing equipment includes a lure and apparatus for connecting the lure to a fishing line, the lure body being formed with a 180° twist about its longitudinal axis and having openings formed along the sides thereof and away from the axis to provide turbulence when the lure revolves about the axis. The integral or separate connecting structure includes, in addition to a snap and a swivel, a flat anti-twist element extending on both sides of the axis so as to be acted upon by water resistance on both sides of the axis, the anti-twist element being formed to simulate a minnow being attacked by the lure.

2 Claims, 9 Drawing Figures

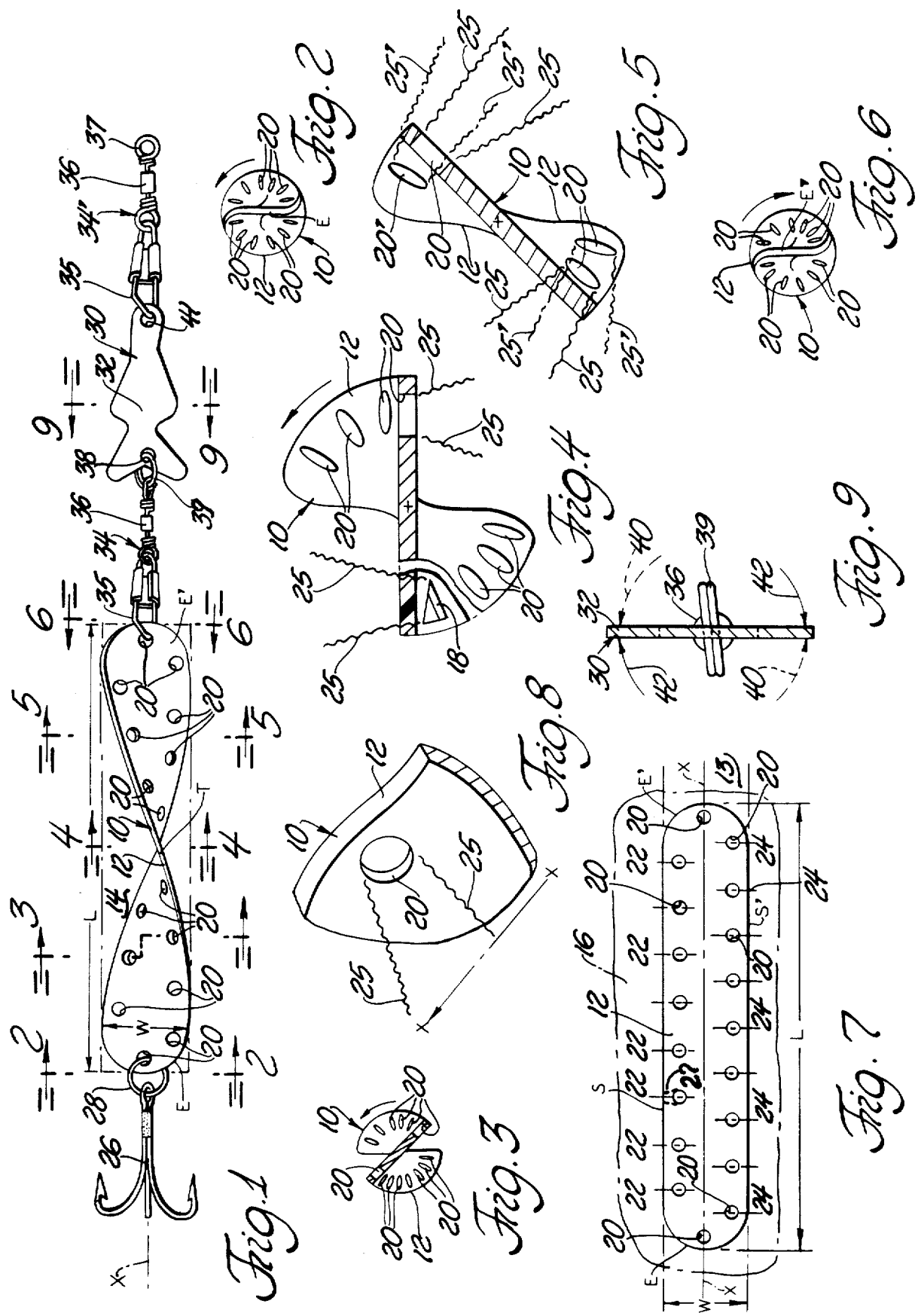

4,501,087

FISHING EQUIPMENT

BRIEF SUMMARY OF THE INVENTION

This invention relates generally to sport fishing equipment, and more particularly to an improved lure and swivel snap wherein a simplified combination of component parts and features coact and contribute to the production of unique terminal tackle utilizing a combination of principles and effectively accomplishing the objects thereof.

Sport fishing is generally classified in several ways. For example, fishing with a line requires a bait, and bait is classified generally as (1) live bait, such as worms and minnows, and (2) artificial bait, such as man-made lures.

Another classification is the method of fishing used, such as still fishing, jigging, casting, drifting, trolling and the like. Trolling and casting are very often done with artificial bait in the form of lures referred to as spoons and plugs.

In trolling, the fisherman is in a moving boat, and the lure is pulled through the water by the boat. In casting, the fisherman is usually (except when casting from a moving boat) stationary and the fishing rod is used to throw the lure out into the water, the reel being used to retrieve the lure. In either case, the object is to make the man-made lure simulate live bait, such as a swimming or crippled minnow, and to thus entice the fish to attack the lure and become hooked. The type, size, color, etc., of the lure, and the speed and manner of trolling or retrieval are varied by a skillful fisherman for that purpose, since it is known that fish react differently under different fishing conditions.

It has been repeatedly reported in the media and elsewhere that there are many millions of sport fishermen in the United States alone, and there must be a like number in the rest of the world. Accordingly, sport fishing is also a big business. A main reason for this is that many, if not most, fishermen are dedicated to the sport and are always on the lookout for some new fishing equipment that they hope will assure their catching more fish and/or that elusive "big" fish.

It is for that reason that hundreds, and perhaps even thousands, of different artificial baits have been invented and used by fisherman, each having some feature intended by its inventor to give some particular effect or "action" that the inventor, manufacturer and users thereof hope will catch more fish. In fact, as part of the sport, fishermen obviously enjoy shopping for and trying out such new lures and other fishing equipment. That is, it seems that if such new lures were not made available from time to time, much of the excitement and fun of the sport would be lost.

Because of the great number of fishing lures (and other equipment) previously invented and used, it is difficult to invent and create new lures in this crowded art. One reason for lure development is the discovery of new fish habits, fish habitat, fishing methods, etc., by fishing experts often sponsored by manufacturers of fishing equipment. That is, such experts, and others aware of their discoveries respond thereto by development of new fishing techniques and equipment, including lures, to take advantage of such new discoveries. However, lures are also invented to provide new equipment to take advantage of well-known fishing principles.

Most lures are somehow intended to simulate minnows or other live bait, such as worms, shrimp, etc. Some lures (plugs, for example) actually look like minnows, with fins, eyes and scales. However, other lures do not look like fish; rather, they (spoons, for example) are intended to flash like shiny minnows or to cause water turbulence like a crippled minnow, etc.

That is, those lures that look like minnows can be used as bait when the fisherman does not have, or does not wish to use, real minnows or other real bait. Those lures that do not look like, but only simulate, live bait, are also used under the above circumstances, but they function differently. For example, some of the latter lures are merely pieces of metal of various colors, shapes, sizes, etc., that, when trolled or retrieved at various speeds, and in various ways, simulate live baits and entice sport fish into a strike.

Further, it is said, and it is undoubtedly true, that the first enticement on the part of a lure manufacturer is to entice the fisherman to purchase the lure. That is, the fisherman must have some thought that the lure will attract fish.

With the above general background, it is recognized that this crowded art includes metal lures that are formed with a twist so that they spin about the twist axis when pulled (or retrieved) through the water. Also, there are metal lures (spoons) that are formed to wobble, rather than spin, in the water. Further, there are non-twisted lures that include means to cause turbulence as they are pulled through the water, such means including various openings formed in the metal lure to include turbulence in the "action" of the lure. Certain fish, like bass for example, are able to and do react to turbulence, even in unclear or murky water, by locating and striking at the turbulence, per se, apparently thinking it is a crippled bait fish.

Accordingly, a main object of this invention is to provide a novel fishing lure with improved and effective combined (1) natural twisting or spinning (flashing) and (2) turbulence actions so as to make a new and better use of the above known fishing theories or principles.

A more specific object of the invention is to provide a lure that is itself twisted so as to be adapted to revolve or spin about the twist axis when the lure is pulled through the water in a direction along the axis, and that is additionally itself formed with openings therein spaced from the twist axis.

Another object of the invention is to provide such a lure wherein the openings tend to reduce the resistance to spinning otherwise caused by the water, by allowing some of the water that would cause such resistance to pass through the openings and, at the same time, cause the increased water turbulence when the water passes through the openings.

Still another object of the invention is to provide such a lure that has streamlined ends to reduce drag in pulling the lure through the water in the direction of the axis.

A further object of the invention is to provide such a lure having such openings formed as far from the twist axis as the width of the lure will permit, so as to increase the speed of rotation of the openings about the axis and thereby maximize the turbulence caused by the openings.

A still further object of the invention is to provide such a lure with openings of various configurations to vary the nature of turbulence produced thereby.

Another object of the invention is to provide such a lure wherein the total twist of the lure body is in the range of 175° to 185°.

Another object of the invention is to provide such a lure having a fish hook secured near the trailing or rear end thereof and fishing line attaching means at the leading or front end thereof, the attaching means having means to prevent the spin or twist of the lure body from twisting the fishing line, such means forming a part of the lure, so as to virtually eliminate inadvertent attachment of the lure to the fishing line without such line twist preventing means.

Another object of the invention is to provide such a lure wherein the attaching means includes twist preventing means in the form of a small fish that looks like it is being chased by the larger lure, but that also resists transmitting lure spin to the line, by non-swivel means.

Another object of the invention is to provide such as novel line anti-twist device that may be employed to quickly attach the fishing line to any lure to prevent line twist during trolling or casting.

These, together with other objects and advantages of the invention, which will become subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE SEVERAL VIEWS OF THE DRAWINGS

FIG. 1 is a side elevational view of a fishing lure embodying the invention;

FIG. 2 is an end elevational view taken on the plane of line 2—2 of FIG. 1, looking in the direction of the arrows;

FIG. 3 is a cross-sectional view taken on the plane of line 3—3 of FIG. 1, looking in the direction of the arrows;

FIG. 4 is an enlarged cross-sectional view taken on the plane of line 4—4 of FIG. 1, looking in the direction of the arrows;

FIG. 5 is an enlarged cross-sectional view taken on the plane of line 5—5 of FIG. 1, looking in the direction of the arrows;

FIG. 6 is an end elevational view taken in the plane of line 6—6 of FIG. 1, looking in the direction of the arrows;

FIG. 7 is a plan view of an intial step by which the line of FIG. 1 may be formed;

FIG. 8 is a still further enlarged, fragmentary perspective view of the lure shown in FIG. 1; and FIG. 9 is an enlarged cross-sectional view of an element of FIG. 1, taken on the plane of line 9—9 of FIG. 1, looking in the direction of the arrows.

DETAILED DESCRIPTION

Referring now to the drawings in greater detail, a lure 10 embodying the invention comprises an elongated lure body 12 (which may be formed from a metal strip 14 shown by the broken line FIG. 1) having thickness T, width W and length L, with parallel sides S and S' and ends E and E', as shown in FIGS. 1 and 7. Alternatively, the body 12 may be stamped from sheet metal 16 (see FIG. 7), it being noted that the ends E and E' are streamlined to minimize drag in the water.

At the same time that the body is stamped from the strip 14 or sheet 16, the openings or holes 20 may be punched (stamped) in the lure body 12. Of course, equivalent turbulence means are possible.

While the lure body dimensions may vary, in one preferred embodiment of the invention tested, the thickness T is approximately 0.0485 inch, the width W is approximately 0.875 inch and the length L is approximately 4.0", the material being polished stainless steel and the openings 20 being round holes of 0.125 inch diameter.

It is apparent that the material and the above dimensions may be varied. For example, color variation may be introduced by making the lure body 12 from copper or brass and/or by painting the metal body. Also, other materials such as molded colored plastics may be used. In another size lure 10 tested, the body had a width W of 0.562 inch and a length L of 2.25 inches, the other dimensions being similar to those set forth above.

Referring again to the drawings, and especially to FIG. 7, it will be noted that in one preferred embodiment the holes 20 along one side S of the body 12 are staggered, rather than aligned, with respect to the holes 20 on the opposite side S' of the body, as shown by the sets of center lines 22 and 24, as and for a purpose to be discussed. It is apparent, however, that such openings may be aligned.

It will be further noted that the ends E and E' of the body 12 are shown as lying in a common plane, that being the plane of the paper in FIG. 1 and in a vertical plane normal to the plane of the paper in FIGS. 2 and 6. This being so, it is apparent that one way of forming the body 12 of FIG. 1 could be by fixing end E of body 12 in FIG. 7 and twisting end E' approximately 180° on the axis X—X. Of course, other methods of forming the twisted body 12 could be by casting, molding or stamping.

End E of body 12 is shown (in FIG. 1) as the rear or trailing ends of the lure 10, and a fish hook 26, which is shown as a treble hook, but which could be some other type hook, is substantially permanently secured to end E by a split ring 28 in the usual manner employed in lure manufacture. Accordingly, as the lure body 12 revolves or twists, the hook 28 will twist with it, which may help to (automatically) set the hook as the game fish inhales the lure 10.

An object of this invention is to provide a lure that twists or spins during trolling or retrieval, and such twist or spin will be transmitted to the fishing line attached to the front or leading end E' of the lure body 12, unless some means is provided to prevent line twist.

There are, of course, various designs of separate devices available to and used by fishermen to prevent line twist, since many trolling type lures, such as spoons, that are designed for non-twisting action (such as mere side-to-side wobble) will, in fact, twist at times, such as when the lure somehow becomes fouled, as by weeds, etc. Most any terminal tackle will twist when it becomes snagged on itself. Every serious fisherman has experienced line twist, often at a most inopportune time so that the opportunity to cast to or catch a fish is lost. A mildly twisted line can sometimes be untwisted by trolling the line without terminal tackle; however, that may be only temporary, and a badly twisted line has to be discarded, which wastes fishing time, even if new line is available at the time.

Devices for preventing line twist are generally referred to as "swivel snaps" because they include both a swivel to prevent twist and a snap, which permits easy and quick changing of lures. One swivel snap design includes a bead chain, in which each bead acts as a swivel, with an intermediate keel-type anti-twist element made of lead. Another popular design incorporates a ball bearing swivel device.

The lure 10 embodying the invention preferably includes, as an integral part thereof, a new and improved fishing line anti-twist means 30, which includes the novel minnow-shaped element 32 and identical well-known swivel/snap elements 34 and 34'. Each of the elements 34 and 34' includes a snap 35, a swivel 36 and a ring 37, but it should be noted that the ring 37 of element 34 is substantially permanently connected at the opening 38 in the tail end of the minnow element 32 by a split ring 39. The snap 35 of element 34' is removably connected at the opening 41 in the head end of the element 32. Finally, the means 30 is removably connected to the leading end E' of the lure body 12 by the snap 35 of element 34 to complete the lure assembly 10.

As stated above, some well-known swivel snap anti-twist devices are the bead chain type, the bead chain with lead keel element type and the ball bearing type.

As seen in FIGS. 1 and 9, the element 32 may be formed (like the lure body 12) by stamping the same from sheet metal such as stainless steel. Further, as seen in FIG. 9, any twisting forces transmitted by the revolving lure body 12 (represented by the broken line arrows 40) that were not already eliminated at the swivel 36 of element 34 are resisted by the opposing force (represented by the solid line arrows 42) of the water acting on the surface of element 32. It is believed that the principle involved is similar to that involved in the operation of a boat rudder. It takes a force input to move the rudder from the plane of the boat keel, and doing so causes the force of the water on the rudder to turn the boat. However, if a force input were not applied, the free rudder would remain in a position parallel with the direction of travel of the boat. Likewise, the action of the water on the element 32 resists rotational forces. Any twisting forces that might for any reason not be eliminated by element 32 are completely eliminated by the final (leading) swivel 36 of element 34' to which the fishing line is tied.

It is intended that the attachment of the improved anti-twist device 30 to the lure body 12 makes it an integral part of the lure 10, so that the fisherman cannot experience a twisted line by forgetting to include a swivel in attaching the lure to the fishing line. Of course, the fisherman could use the lure body 12 with only a single swivel snap 34', which is commercially available. However, as described, the device 30 adds to or improves the anti-twist function of swivel snap 34' by adding swivel snap 34 to which the element 32 is connected. It is further apparent that the snaps 35 could be split rings such as ring 39. Snaps 35 provide versatility and ease of assembly; split rings are essentially permanent.

In fact, it is believed that element 32 is more effective (as compared to existing devices) as an anti-twist device, and that it should be made available as a separate swivel snap device for connecting any lure to a fishing line, either alone (like a keel type device), or in combination with some other swivel snap 34' as shown in FIG. 1.

A lure 10 with element 32 was trolled a substantial distance with no line twist, and a stainless steel element 32 of 0.060" thickness adds a wobble action to the basic lure twist. Element 32, which is neither a swivel nor a keel type device, prevents twist by water resistance on both sides of axis X—X, as in FIG. 9.

SUMMARY OF OPERATION OF THE INVENTION

As stated, a main object of the invention is to provide a lure that not only spins or twists, but also produces a certain type and degree of turbulence, as the lure is trolled or retrieved in casting, without twisting the fishing line, by means 20 spaced from axis X—X.

The twist of the lure about the axis X—X does, in fact, cause the lure to revolve or twist, so as to flash, like a minnow. Testing has shown that the optimum twisting rate or action occurs in a lure having a total twist, over the length of the lure, within the range of 175°-185°. That is, it appears, from testing of twisted metal lures of the general dimensions described above, that the best spinning (flashing) action occurs in lures having a total twist in the above range.

However, the degrees of twist may be varied, another main feature of the invention being the openings 20 formed in the lure body 12. It will be seen from FIG. 7 that the openings 20 (except the end openings) are preferably formed nearer the sides S and S' of the lure body 12, and preferably as far as possible from the axis X—X of the body, where the rotation speed is greatest. The principle is the same as that in a wheel, wherein a point on the outer circumference of a wheel moves at a greater rotational speed than a point at or nearer the center of the wheel.

In the drawings, the wavey lines 25 represent the turbulence caused by water passing through the openings 20, as the lure body 12 revolves in the direction of the solid arrows. In FIG. 5, turbulence 25 is caused by opening 20, while turbulence 25' is caused by opening 20'. The intensity of the turbulence caused by openings 20 on centerlines 22 and 24 exceed that of the turbulence caused by the openings 20 on axis X—X at ends E and E' of the lure body 12. Further, the intensity of turbulence caused by openings formed in a revolving lure exceeds that of openings formed in a wobbling lure.

Additionally, the turbulence 25 occurs at every opening 20, and staggering the openings 20 (as shown in FIG. 7) results in a different and more intensive turbulence than if the openings were aligned on sides S and S'. Further, varying the shape of the opening, as shown at triangular opening 18, for example, can vary the intensity and nature of the turbulence.

The above described anti-twist action of element 32 is believed to be substantially greater than, and different from, that of lead keel, ball chain type device referred to above, since the keel is formed and positioned by gravity on only one side of the centerline of the device. Further, the element 32 of means 30 is not formed of lead (it functions on a different principle) like keel type devices, so that it is not as heavy and does not cause the lure to sink as far. However, element 32 could be formed of lead, if so desired (as for use with a small or lightweight lure) without changing the principle of operation, to make the lure sink further.

Also, use of the minnow shape of element 32 actually simulates a larger fish (the lure body 12 and hook 26) chasing a minnow, which may excite a game fish into striking the lure 10, and turbulence means 20 enhances this action.

From the above description of preferred embodiments of the invention, it will be seen that an important reference is the rotational or swivel axis X—X. That is, the lure body is designed to spin or revolve about axis X—X, as shown, and the element 32 of device 30 is acted upon by resistance of water on opposite sides of the axis X—X to prevent line twist. Further, the effect of the turbulence means, such as openings 20, is enhanced by disposing the same off the rotational axis X—X.

With respect to the turbulence means, it is apparent that they need not be limited to openings fully enclosed by lure material. For example, the turbulence means might comprise indentations of the sides S/S', as might be formed by the openings 20 breaking out to or through the sides or edges S and S', as shown at 27 by broken lines, or by portions of lure body 12 bent out of the body near the sides thereof.

Finally, as to the integral anti-twist device 30, it is intended that snap elements 35 can be and are considered as elements 35/39. That is, in the permanent combination of lure body 12 and the anti-twist device 30, such elements 35/39 are split rings, such as 39 shown in FIG. 9 or ring 28 in FIG. 1; in the less permanent combination of the separate element 34 including element 32 for use with other lures, such elements 35/39 are snaps 35 as shown in FIG. 1.

It is believed that careful consideration of the specification and the claims in conjunction with the drawings will give the reader a clear and comprehensive understanding of the construction, features, and advantages and method of use of the fishing tackle embodying the invention. Further, it is clear that the structure described accomplishes the objects stated above. Therefore, a more detailed description is believed to be unnecessary.

The foregoing is considered as illustrative only of the principles of the invention. Further, since numerous modifications and changes will occur to those skilled in the art, it is not intended to limit the invention to the exact construction and operation shown and described. Accordingly, all suitable modifications and equivalents may be resorted to, falling within the scope of the appended claims.

What I claim as my invention is:

1. A fishing lure of the type to be cast and retrieved or trolled, said lure comprising a body having width, length, thickness, sides and leading and trailing ends, said body being formed to provide a twisted configuration and having a longitudinal axis, said body having a plurality of separate turbulence producing means formed thereon spaced between said axis and said sides, fishhook means provided at said trialing end and fishing line attaching means at said leading end, whereby said body is caused to revolve about said longitudinal axis when said lure is trolled or retrieved, the rotational speed in distance traveled of each of said plurality of turbulence producing means being greater than the rotational speed at said axis by reason of said means being spaced from said axis and near said sides and thus causing greater water turbulence than if said means were at said axis, said fishing line attaching means including means for preventing lure twist from twisting the fishing line, said latter means including a combination of at least one swivel and a flat anti-twist element extending on both sides of said axis so as to be acted upon by water resistance on both sides of said axis, said flat element being formed in the shape of a minnow, including a head, a body with fins on both sides and a fluked tail, said shape being substantially symmetrical with respect to said axis, said lure simulating a fish attacking a minnow.

2. A device for preventing twist in a fishing line connected to a fishing lure, said device having a swivel axis and comprising snap means at one end of said device adapted to connect said device to a lure, means at the other end of said device by which the fishing line can be connected to said device, at least one swivel means connected between said end means and a flat anti-twist means connected between one of said end means and said swivel means, said anti-twist means extending on both sides of said axis so as to be acted upon by water resistance on both sides of said axis and said anti-twist means being formed in the shape of a minnow, including a head, a body with fins on both sides and a fluked tail, said shape being substantially symmetrical with respect to said axis, the lure to which said device is attached simulating a larger fish attacking said minnow-shaped device.

* * * * *